United States Patent [19]

Kerendian

[11] Patent Number: 5,794,751
[45] Date of Patent: Aug. 18, 1998

[54] PISTON FOR TORQUE TRANSMITTING SYSTEMS

[75] Inventor: Hormoz Kerendian, Huntersville, N.C.

[73] Assignee: Sanford Acquisition Company, Bingham Farms, Mich.

[21] Appl. No.: 724,922

[22] Filed: Oct. 2, 1996

[51] Int. Cl.$^6$ .................................................. F16D 25/0638
[52] U.S. Cl. ........................................................ 192/85 AA
[58] Field of Search ........................ 192/85 AA, 109 F, 192/52.2, 52.3, 70.14

[56] References Cited

U.S. PATENT DOCUMENTS

| | | | |
|---|---|---|---|
| 1,700,493 | 1/1929 | Guay | 192/52.3 |
| 2,880,834 | 4/1959 | Gerst | 192/85 AA |
| 3,126,079 | 3/1964 | Howard . | |
| 3,126,752 | 3/1964 | Bolster . | |
| 3,130,595 | 4/1964 | Cook . | |
| 3,266,608 | 8/1966 | Lemieux | 192/85 AA |
| 3,370,682 | 2/1968 | McFarland . | |
| 3,893,345 | 7/1975 | Sisson et al. . | |
| 4,006,805 | 2/1977 | Zeller et al. . | |
| 4,036,344 | 7/1977 | Nolan | 192/85 AA X |
| 4,040,339 | 8/1977 | Ivey . | |
| 4,099,603 | 7/1978 | Peppel . | |
| 4,164,876 | 8/1979 | Peppel . | |
| 4,173,269 | 11/1979 | Craig . | |
| 4,181,041 | 1/1980 | Frost . | |
| 4,301,689 | 11/1981 | Peppel . | |
| 4,442,929 | 4/1984 | Uchida . | |
| 4,463,842 | 8/1984 | Redzinski . | |
| 4,562,902 | 1/1986 | Scibbe . | |
| 4,611,506 | 9/1986 | Groothius . | |
| 4,623,055 | 11/1986 | Ohkubo | 192/109 F X |
| 4,664,242 | 5/1987 | Downs . | |
| 4,732,052 | 3/1988 | DeWald . | |
| 4,917,002 | 4/1990 | Pociask . | |
| 4,934,502 | 6/1990 | Horsch . | |
| 4,969,546 | 11/1990 | Haka . | |
| 4,970,945 | 11/1990 | Schmidt . | |
| 5,016,742 | 5/1991 | Peier . | |
| 5,031,746 | 7/1991 | Koivunen . | |
| 5,090,539 | 2/1992 | Wolf et al. | 192/85 AA |
| 5,094,328 | 3/1992 | Palmer . | |
| 5,174,420 | 12/1992 | DeWald et al. . | |
| 5,261,517 | 11/1993 | Hering . | |
| 5,307,730 | 5/1994 | Erwin . | |
| 5,335,763 | 8/1994 | Katoh . | |

*Primary Examiner*—Rodney H. Bonck
*Attorney, Agent, or Firm*—Watts, Hoffmann, Fisher & Heinke

[57] ABSTRACT

A device is provided for actuating force-receiving members of a torque transmission apparatus. The force-receiving members engage first and second rotatable members. The device includes a body with a working face adapted to apply a force to the force-receiving members, wherein at least a portion of the working face includes an arcuate surface.

16 Claims, 4 Drawing Sheets

PISTON FOR TORQUE TRANSMITTING SYSTEMS

FIELD OF THE INVENTION

The present invention relates to a piston and, in particular, to a piston for torque transmitting systems.

BACKGROUND OF THE INVENTION

In vehicles such as relatively large off-highway vehicles, a multiple ratio gear drive assembly is usually provided as an integral part of a power train assembly. The gear drive assembly includes a plurality of hydraulically actuated power-shift clutch assemblies serially arranged within a limited space to allow the gear drive assembly to rapidly shift from one gear ratio to another. The clutch assemblies are sequentially operated to connect/disconnect a rotating input member and rotational output members until a desired speed for the vehicle is accomplished.

A typical hydraulic clutch assembly includes a plurality of interleaved clutch plates. Alternating clutch plates are splined to and rotatable with a rotational input member and the remainder of the clutch plates are splined to and rotatable with another rotational member, i.e., a clutch housing. These interleaved clutch plates transfer rotational motion and torque between the rotating members as a function of axial compression of the plates by a clutch actuator.

The clutch actuator may be in the form of an annular, fluid responsive piston which is operative to apply a compressive force to the interleaved plates. One or more fluid passageways are provided to supply a fluid column to the hydraulic piston chamber sufficient to control piston displacement. An end plate may be disposed at an end of the clutch pack remote from the piston. A snap ring disposed at the outer periphery of the end plate prevents axial movement of the end plate and the clutch pack away from the piston.

When the piston applies a clamping force against the plates, since only the outer periphery of the end plate is supported by the snap ring, the end plate and the clutch plates may bend with respect to the snap ring. As a result, there is an unequal distribution of pressure among the interleaved plates. This is undesirable as it may lead to problems such as uneven wear and overheating of the plates when the clutch is actuated.

SUMMARY OF THE INVENTION

The present invention is directed to a piston for torque transmitting systems. At least a portion of a working face of the piston includes a radiused surface which avoids the problem of unequal pressure distribution in plates of the torque transmitting system.

In preferred form, the present invention is directed to a piston for actuating interleaved discs of a torque transmission apparatus. The interleaved discs engage first and second relatively rotatable members. The piston comprises a body with a working face adapted to apply a force to the interleaved discs. At least a portion of the working face includes an arcuate surface. More preferably, the working face is constructed to include a flat surface and the arcuate surface may extend tangentially from the flat surface.

Another aspect of the invention is directed to a torque transmission apparatus including the interleaved discs and the piston. The piston is constructed according to the present invention. The working face of the piston includes the arcuate surface and, preferably, the flat surface. The arcuate surface may extend tangentially from the flat surface. This aspect of the invention may also include a support member adjacent an axial end of the discs that is located distally from the working face of the piston.

If the support member is disposed adjacent an outer portion or diameter of the discs, the working face is adapted to avoid contacting the outer portion of the adjacent first disc. Conversely, if the support member is disposed adjacent an inner portion of the discs, the working face is adapted to avoid contacting the inner portion of the first disc. An end plate may also be disposed axially between the support member and one of the discs.

In a general form, the present invention is directed to a device for actuating force-receiving members of a torque transmission apparatus. The force-receiving members engage first and second rotatable members. The device comprises a body with a working face adapted to apply a force to the force-receiving members, wherein at least a portion of the working face comprises an arcuate surface.

The present invention overcomes the problem of an unequal pressure distribution in, for example, a clutch pack of a vehicular transmission. The arcuate or radiused surface of the piston compensates for the deflection of the end plate and the clutch pack by allowing the contact area between the piston and the adjacent plate to increase or decrease along the curvature of the piston as the applied pressure increases or decreases, respectively. In contrast, the contact area between the conventional piston and clutch pack is concentrated at the outer peripheral portion of the clutch pack due to the bending of the end plate and bending or deflection of the clutch pack around the snap ring located at the outer peripheral portion of the clutch pack. The piston of the present invention brings the contact area closer to the mean radius of the pack, as opposed to its outer periphery, which results in a more uniform pressure distribution in the clutch pack.

A method of the invention pertains to actuating force-receiving members of a torque transmission apparatus. The force-receiving members engage the first and second rotatable members. The method includes the step of engaging the force-receiving members with a working face of a force-transmitting device. A force is applied against the force-receiving members with the arcuate surface of the working face. In preferred form, the device applies a force on an adjacent one of the force-receiving members so that a contact area increases in a direction from an inner portion of the working face toward an outer portion of the working face as the force is increased.

Other embodiments of the invention are contemplated to provide particular features and structural variants of the basic elements. The specific embodiments referred to as well as possible variations and the various features and advantages of the invention will become better understood from the accompanying drawings and the detailed description that follows.

DETAILED DESCRIPTION OF PREFERRED EMBODIMENTS

Figure 1:
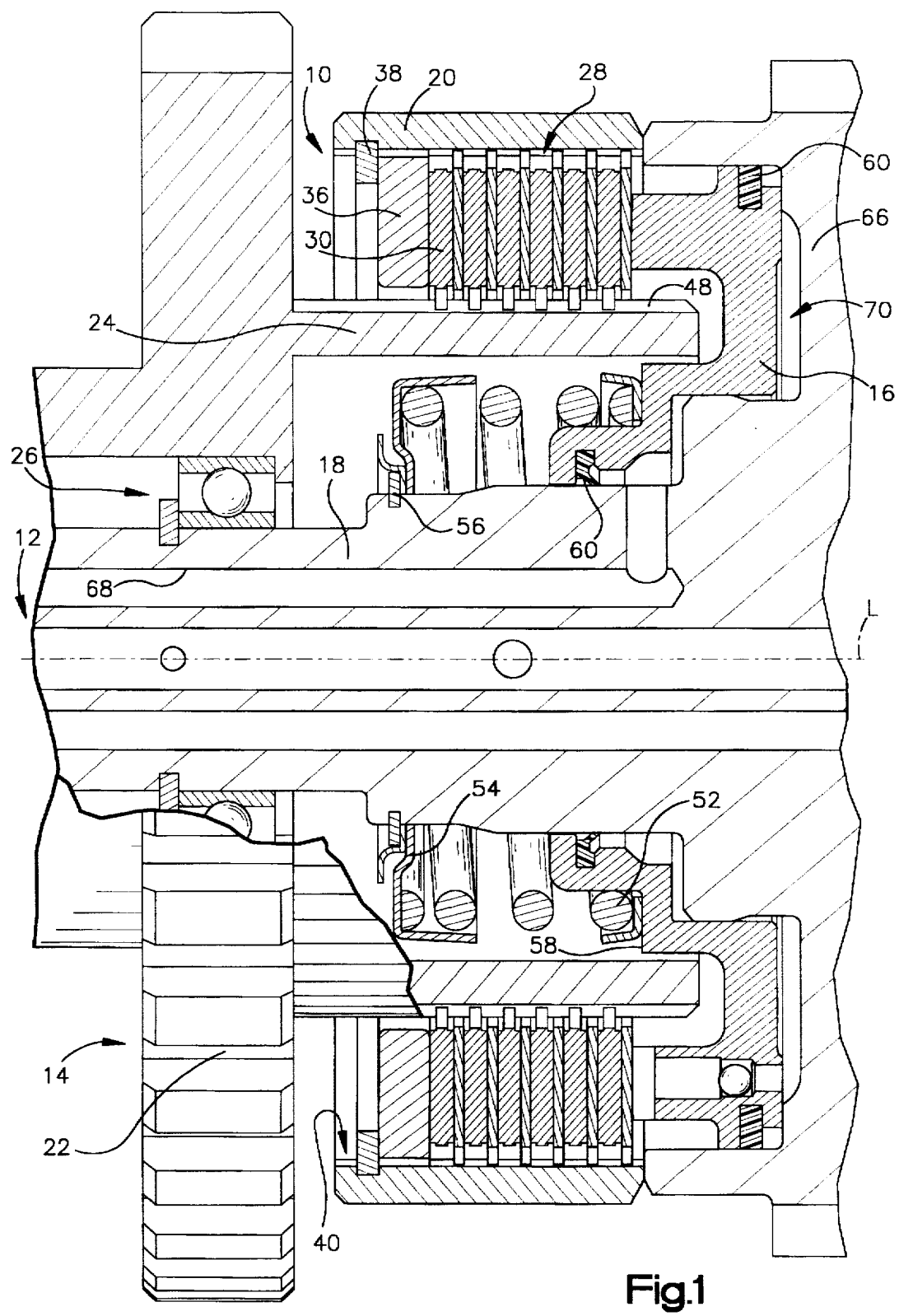
FIG. 1 is a cross-sectional view of a clutch assembly employing a piston constructed in accordance with the present invention.

Referring generally to the drawings and to FIG. 1 in particular, a representative form of a torque transmitting system is shown. To facilitate its understanding, the present invention will be described with respect to a torque transmitting system in the form of a clutch assembly 10 incorporated in a vehicular transmission. The illustrated clutch assembly 10 may be one of a series of such clutches arranged within the transmission to provide a variety of torque-multiplying gear ratios.

The clutch assembly 10 is interposed between two first and second coaxial relatively rotatable members 12, 14. An annular piston 16 constructed in accordance with the present invention is operative as a clutch actuator. At least one of the members 12, 14 is rotatable, the other being either rotatable or fixed. Thus, the clutch assembly 10 and the piston 16 may be employed in conjunction with either clutch or brake mechanisms. The first rotatable member 12 of the clutch assembly 10 includes a shaft 18 that extends along a longitudinal axis L and has a drum 20 that is coaxially arranged with respect to the shaft.

The second rotatable member 14 of the clutch assembly 10 is arranged on the shaft 18 for relative rotation with respect thereto. The second rotatable member 14 is illustrated herein as an input gear 22 having a hub 24 that is coaxially arranged with respect to the shaft 18. The gear 22 forms part of a gear train (not shown) and is rotatably supported on the shaft 18 by a bearing 26 in a well known manner.

The clutch assembly 10 provides a frictional coupling between the shaft 18 and the gear 22. The clutch assembly includes a clutch pack 28 comprising axially aligned interleaved friction discs or annular plates 30. The clutch pack 28 may include any number of clutch plates. As is known in the art, in a six plate clutch pack, for example, six plates are used in association with each of the rotating members.

Figure 2:
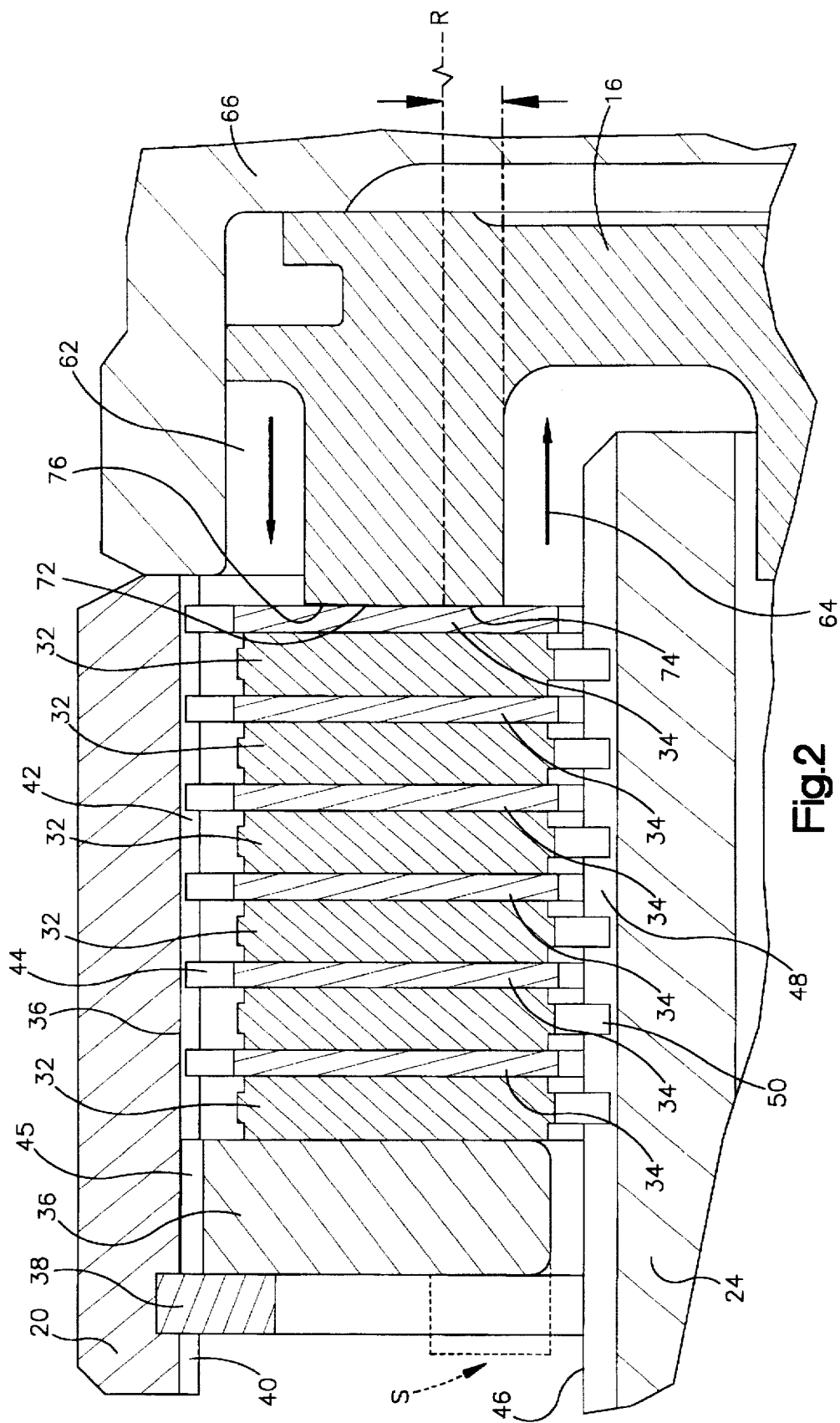
FIG. 2 is an enlarged view of a portion of FIG. 1.

As best shown in FIG. 2, a first group of plates 32 alternates axially with respect to a second group of plates 34. The first group of plates 32 may be provided with a friction facing material and the second group of plates 34 may be separator plates as is known to those skilled in the art. An annular end plate 36 is arranged at an end of the clutch pack 28 that is located distally from the working face of the piston. A snap ring 38 is received by a circumferential groove in the interior surface 40 of the drum 20 and prevents movement of the plates 32, 34 and the end plate 36 in an axial direction away from the piston.

As shown in FIG. 2, the drum 20 includes interior splines 42 on its interior surface 40 that mate with splines 44 on the outer periphery of the separator plates 34 to achieve an engagement therebetween which prevents relative rotational movement between the separator plates 34 and the drum 20 while permitting relative axial movement. The end plate 36 also includes splines 45 on its outer periphery that mate with the interior splines 42. These splined connections 42, 45 prevent relative rotational movement between the end plate 36 and the drum 20 while permitting relative axial movement. An exterior surface 46 of the gear hub 24 includes exterior splines 48 that mate with splines 50 on the inner periphery of the frictional plates 32. These splined connections 48, 50 prevent relative rotational movement between the frictional plates 32 and the gear hub 24, while permitting relative axial movement.

A piston return spring 52 is disposed in a casing 54 around the shaft 18 and is axially interposed between a snap ring 56 and the piston 16. The snap ring 56 is received by a groove in the shaft 18. The spring 52 acts upon a shoulder 58 of the piston 16 in a well known manner. Seals 60 are carried by the piston. As shown in FIGS. 1 and 2, the piston 16 is axially movable along the longitudinal axis L in a first direction 62 toward the clutch pack 28 and in a second opposite direction 64 toward a clutch hub 66 of the drum 20. The piston 16 is moved hydraulically in the first direction 62 by action of pressurized oil. The oil travels from a pressurized fluid supply (not shown) through a passageway 68 in the shaft 18 to a region 70 rearward of the piston 16.

Figure 3:
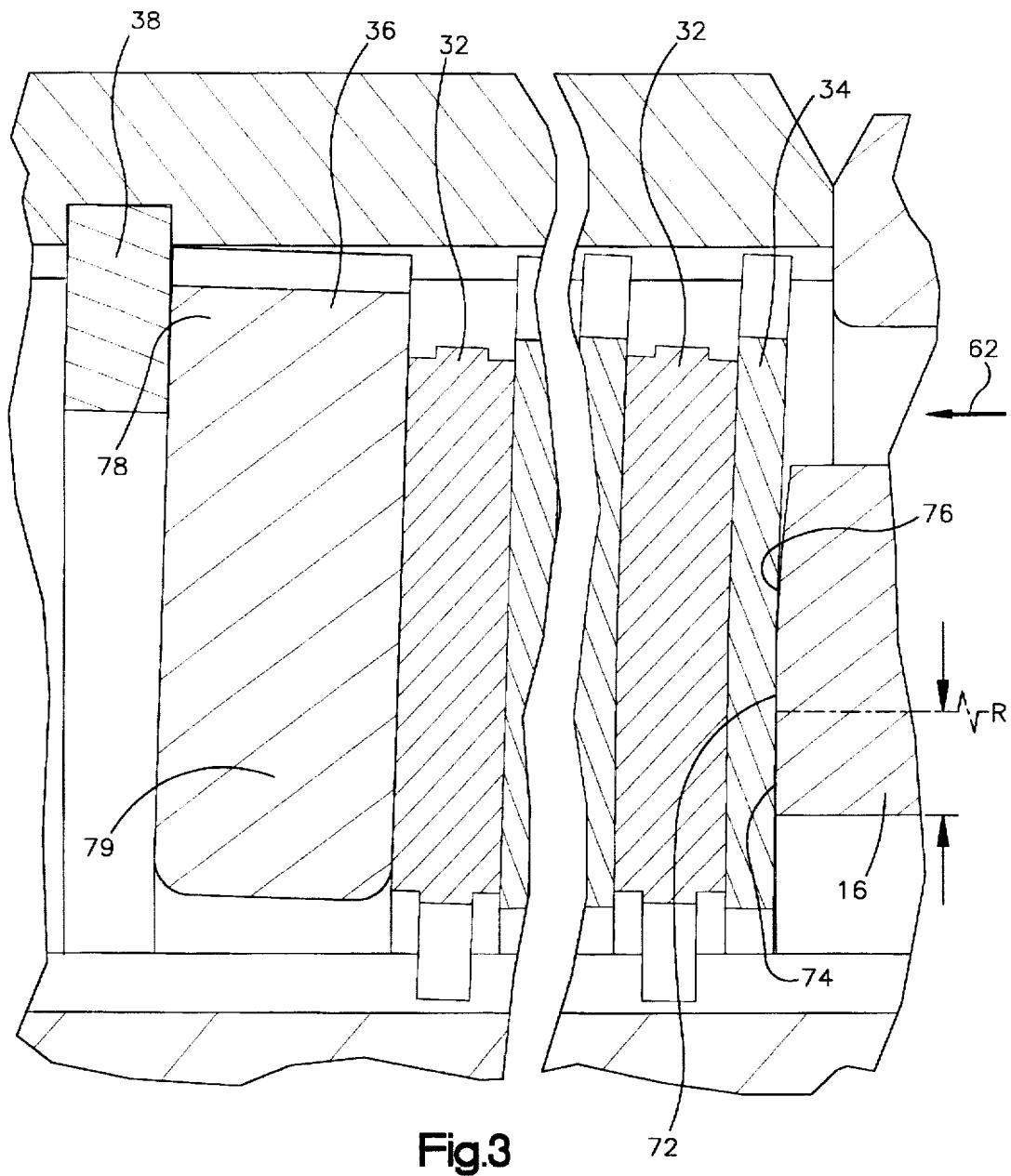
FIG. 3 is an enlarged fragmentary view of a portion of FIG. 1.

The piston 16 is constructed in accordance with the present invention such that its working or pressure applying face 72 (FIG. 2) preferably includes a flat surface 74 and an arcuate or radiused surface 76. The radiused surface 76 has a radius R, and is preferably tangent to the flat surface at the point where the radius line R meets the working face 72 (FIG. 3).

The entire working face of the piston may be radiused without a flat surface. However, in a preferred embodiment the radiused surface 76 is tangent to the flat surface 74, which eliminates point contact between the piston 16 and the first separator plate 34 at low piston pressures. The flat surface 74 also facilitates machining the piston 16 by providing a locating surface for the cutting machine.

Those skilled in the art will appreciate in view of this disclosure that the size of the radius R and the location of the radiused surface 76 along the working face 72 may vary depending upon factors including the magnitude of the pressure applied by the piston 16, the composition of the piston friction material, the number of clutch plates 30, and the sizes and configurations of the clutch plates 30, the end plate 36, the snap ring 38 and the piston 16. The piston 16 is formed of a suitable material known to those skilled in the art such as aluminum or cast iron. The piston working face 72 is constructed, taking all of the foregoing factors into consideration, to produce a substantially uniform pressure distribution throughout the clutch pack 28.

Figure 4:
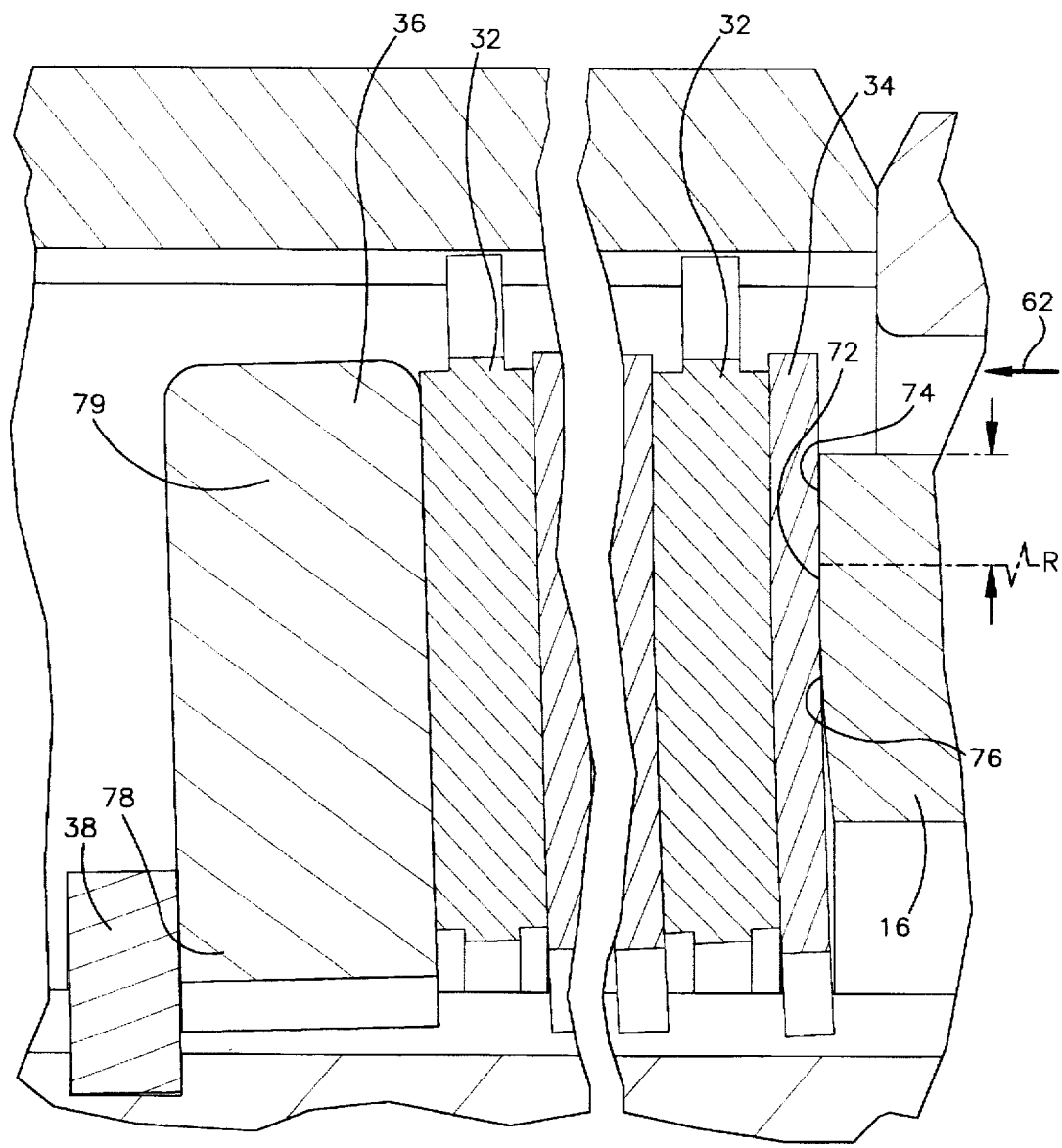
FIG. 4 is similar to FIG. 3 but showing the arrangement of parts when the snap ring is disposed adjacent an inner portion of the clutch assembly.

It will be appreciated that the arrangement of the snap ring, the end plate and the radiused surface may be reversed. That is, the snap ring and the end plate may be disposed at the inner periphery of the plates (connected to the gear hub 24) and the radiused surface may be disposed at least at the inner periphery of the working face. This is shown in FIG. 4 wherein like reference numerals designate like parts with respect to FIG. 3 and throughout the several views. The description in this disclosure of the apparatus of FIG. 3 having the radially outer located snap ring applies herein to FIG. 4, except for the position of the snap ring, the end plate 36 and radiused surface 76 and connection of the end plate 36 and the plates 32, which are reversed with respect to FIG. 3, as would be appreciated by those skilled in the art in view of this disclosure.

The following provides exemplary design specifications of a preferred piston and clutch assembly of the present invention. In a six plate clutch pack, the radiused surface 76 preferably has a radius R of 9 inches. The separator plates 34 are preferably either 0.0690 inches or 0.0875 inches thick. In one particular example, the working face 72 is 0.44 inches long and has an outer diameter of 5.50 inches, the tangent between the radiused surface and the flat surface being located 0.31 inches radially inward from the outer diameter of the piston.

In operation, to engage the clutch the pressurized oil communicates with the region 70, which moves the piston 16 in the first axial direction 62 against the force of the spring 52. When sufficient axial pressure is applied to the plates 30, a drive connection is established and motion is transmitted between the shaft 18 and the gear 22. As will be understood, torque transfer and rotation between the shaft and the gear are controlled as a function of the axial compression of the plates as determined by the amount or level of pressure applied to the clutch assembly.

As shown in FIG. 3, since only the outer periphery 78 of the end plate 36 is supported by the snap ring 38, an inner peripheral portion 79 of the end plate 36 bends when the piston clamps the plates 30 against the end plate. As used herein, reference to "bending" in connection with the end plate 36 or the plates 30 means deflection and/or elastic deformation. The piston clamping force may subject the end plate 36 to stresses in excess of about 35000 psi.

In effect, when the piston moves into clamping engagement with the plates 30, the end plate 36 will bend in generally the first direction 62 around the snap ring 38 in a manner represented by FIG. 3. The clutch plates 30 may also bend under the load applied by the piston 16. It is believed that an end plate having a uniform thickness, such as the end plate 36, deflects more than an end plate having a stepped portion such as stepped portion S shown in FIG. 2. It will be appreciated that FIG. 3 is provided for purposes of illustration and greatly exaggerates the actual bending of the end plate 36, any bending of the plates 30 and the radius of the piston 16.

When the end plate 36 bends around the snap ring 38 upon application of the piston clamping force, the inner periphery 79 of the end plate 36 may bend more in the first direction 62 than the outer periphery 78 of the end plate 36 that is supported by the snap ring. Likewise, the plates 30 may bend more in the first direction 62 at their inner periphery than at their outer periphery. The snap ring may also bend under the applied clamping force.

The radiused piston design compensates for the deflection of the end plate and the clutch plates by allowing the contact area between the piston and the first separator plate to increase or decrease with increasing or decreasing pressure, respectively, along the curvature of the working face of the piston (based on the value of the radius). The ability to bring the contact area closer to the mean contact radius of the clutch pack produces a substantially uniform pressure distribution in the clutch pack and is an important feature of the present invention.

More specifically, when actuated, the flat face of the piston initially contacts the adjacent first separator plate. As the pressure applied by the piston increases, the contact area increases outwardly on the piston face along its radiused surface. That is, the first separator plate initially contacts the piston near the inner portion of the working face and then, by virtue of a rolling engagement along the radiused surface, contacts the piston at more radially outward locations of the working face as the piston pressure increases. The outer periphery of the working face preferably does not contact the first separator plate. The piston is designed so that no pressure is applied to regions on the first separator plate that are directly axially opposite to the snap ring.

When the reverse orientation of the clutch is used, that is the snap ring is located at the inner periphery of the discs and the radius is located at least at the inner periphery of the working face, as the force applied by the piston increases, the contact area between the first separator plate and the piston will increase in a direction from the outer periphery toward the inner periphery of the working face.

To disengage the clutch assembly 10, the oil pressure is released, enabling the force of the spring 52 to move the piston 16 in the second axial direction 64. Oil may travel through the fluid passageway 68 toward the fluid source. The drive connection between the shaft 18 and the gear 22 is thereby disengaged, permitting the shaft and the gear to rotate freely with respect to each other.

Although the invention has been described in its preferred form with a certain degree of particularity, it will be understood that the present disclosure of the preferred embodiments has been made only by way of example and that various changes may be resorted to without departing from the true spirit and scope of the invention as hereafter claimed.

What is claimed is:

1. In a torque transmission apparatus including interleaved discs extending along an axis for engaging an inner rotatable member and an outer rotatable member, and a piston located radially between the inner rotatable member and the outer rotatable member for actuating the interleaved discs, the improvement comprising: said piston comprising a working face that applies apply a force to an adjacent one of the discs, said working face extending transverse to said axis between a first side of said piston located adjacent said outer rotatable member and a second side of said piston located adjacent said inner rotatable member, and a support member spaced along said axis at a location remote from said piston such that said interleaved discs are disposed between said piston and said support member, wherein at least a portion of said working face comprises an arcuate surface that extends from one of said first side and said second side that is more proximal to a radial position of said support member than the other of said first side and said second side effective to produce a substantially uniform pressure distribution across the discs.

2. The improvement of claim 1 wherein a portion of said working face comprises a flat surface.

3. The improvement of claim 2 wherein said arcuate surface extends tangentially from said flat surface.

4. The improvement of claim 1 wherein said support member is disposed at a radially outer portion of the discs and said arcuate surface extends from said first side of said piston.

5. The improvement of claim 1 wherein said support member is disposed at a radially inner portion of the discs and said arcuate surface extends from said second side of said piston.

6. The improvement of claim 1 further comprising an end plate disposed along said axis between said support member and one of the discs.

7. The improvement of claim 1 wherein said adjacent disc has a thickness not larger than a thickness of a contiguous one of said discs.

8. A method of actuating force-receiving members of a torque transmission apparatus, the force-receiving members extending along an axis and engaging a first outer rotatable member and a second inner rotatable member, comprising the steps of engaging an adjacent one of the force-receiving members with a working face of a force-transmitting device, said working face extending transverse to said axis between a first side of the force-transmitting device adjacent said first rotatable member and a second side of the force-transmitting device adjacent said second rotatable member, wherein a support member is spaced along said axis at a location remote from said force-transmitting device such that said force-receiving members are disposed between said force-transmitting device and said support member, applying a force to said adjacent force-receiving member with an arcuate surface of said working face that extends from one of said first side and said second side that is more proximal to a radial position of said support member than the other of said first side and said second side, and producing a substantially uniform pressure distribution across the force-receiving members.

9. The method of claim 8 wherein said support member is disposed at a radially outer portion of the force-receiving members and said arcuate surface extends from said first side of said force-transmitting device, comprising contacting said adjacent force-receiving member with an area of said arcuate surface that increases moving in a radial direction from said second side toward said first side as the applied force increases.

10. The method of claim 9 wherein said working face comprises a flat portion, comprising engaging said adjacent force-receiving member with said flat portion.

11. The method of claim 8 wherein said support member is disposed at a radially inner portion of the force-receiving members and said arcuate surface extends from said second side of said force-transmitting device, comprising contacting said adjacent force-receiving member with an area of said arcuate surface that increases moving in a radial direction from said first side toward said second side as the applied force increases.

12. The method of claim 11 wherein said working face comprises a flat portion, comprising engaging said adjacent force-receiving member with said flat portion.

13. The method of claim 8 comprising applying force with said piston on said adjacent force-receiving member, wherein said adjacent force-receiving member has a thickness not larger than a thickness of a contiguous one of said force-receiving members.

14. In a torque transmission apparatus including force-receiving members extending along an axis for engaging an inner rotatable member and an outer rotatable member, and a force-transmitting device located radially between the inner rotatable member and the outer rotatable member for actuating the force-receiving members, the improvement comprising: said force-transmitting device comprising a working face that applies a force to an adjacent one of the force-receiving members, said working face extending transverse to said axis between a first side of said force-transmitting device located adjacent said outer rotatable member and a second side of said force-transmitting device located adjacent said inner rotatable member, and a support member spaced along said axis at a location remote from said force-transmitting device such that said force-receiving members are disposed between said force-transmitting device and said support member, wherein at least a portion of said working face comprises an arcuate surface that extends from one of said first side and said second side that is more proximal to a radial position of said support member than the other of said first side and said second side effective to produce a substantially uniform pressure distribution across the force-receiving members.

15. The improvement of claim 14 wherein said adjacent force-receiving member has a thickness not larger than a thickness of a contiguous one of said force-receiving members.

16. The improvement of claim 14 comprising an end plate disposed along said axis between said support member and one of the force-receiving members, said end plate comprising a stepped portion.

* * * * *